(12) United States Patent
Pan

(10) Patent No.: US 8,779,668 B2
(45) Date of Patent: Jul. 15, 2014

(54) ALTERNATING CURRENT LIGHT-EMITTING DIODE LAMP ADAPTIVE TO AMBIENT LUMINANCE

(75) Inventor: Cheng-Hung Pan, Taipei (TW)

(73) Assignee: Luxul Technology Incorporation, Taipei (TW)

( * ) Notice: Subject to any disclaimer, the term of this patent is extended or adjusted under 35 U.S.C. 154(b) by 194 days.

(21) Appl. No.: 13/565,771

(22) Filed: Aug. 2, 2012

(65) Prior Publication Data

US 2013/0049604 A1 Feb. 28, 2013

(30) Foreign Application Priority Data

Aug. 26, 2011 (TW) .............................. 100130638 A

(51) Int. Cl.
*H05B 37/02* (2006.01)
(52) U.S. Cl.
USPC ......................................................... 315/151
(58) Field of Classification Search
None
See application file for complete search history.

(56) References Cited

U.S. PATENT DOCUMENTS

| | | | | |
|---|---|---|---|---|
| 5,786,665 A * | 7/1998 | Ohtsuki et al. | ................. | 313/512 |
| 5,834,889 A * | 11/1998 | Ge | .................. | 313/493 |
| 6,201,352 B1 * | 3/2001 | Ge et al. | ..................... | 315/169.1 |
| 7,969,097 B2 * | 6/2011 | Van De Ven | .................. | 315/112 |
| 8,274,237 B2 * | 9/2012 | Nagase et al. | ................. | 315/247 |
| 2010/0156324 A1 * | 6/2010 | Nagase et al. | ................. | 315/307 |
| 2011/0031890 A1 * | 2/2011 | Stack | ............................ | 315/228 |

* cited by examiner

*Primary Examiner* — Crystal L Hammond
(74) *Attorney, Agent, or Firm* — Pai Patent & Trademark Law Firm; Chao-Chang David Pai

(57) ABSTRACT

An AC LED lamp adaptive to ambient luminance has a lamp shell, an LED lamp board, an LED driving circuit and a luminance sensor. The LED lamp board, the LED driving circuit and the luminance sensor are mounted inside the lamp shell and are electrically connected to each other. The luminance sensor is mounted on the LED lamp board, is capable of sensing light emitted from the LED lamp board. Multiple LED elements on the LED lamp board are alternately driven to turn on and turn off and a luminance signal is sensed by the luminance sensor while the LED elements are driven to turn off. As the luminance signal contains an ambient luminance only, accurate ambient luminance for the lamp can be therefore acquired.

16 Claims, 4 Drawing Sheets

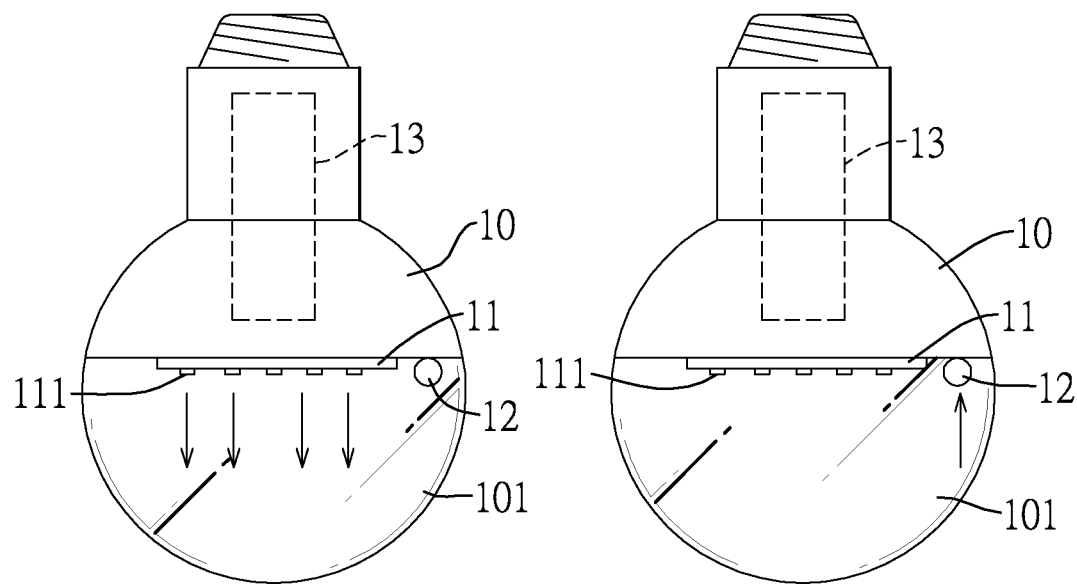

ALTERNATING CURRENT LIGHT-EMITTING DIODE LAMP ADAPTIVE TO AMBIENT LUMINANCE

BACKGROUND OF THE INVENTION

1. Field of the Invention

The present invention relates to an alternating current (AC) light-emitting diode (LED) lamp and more particularly to an AC LED lamp adaptive to ambient luminance.

2. Description of the Related Art

Lamps are indispensable electronic appliances required for lighting in human daily life. The march of technological progress has driven manufacturers to launch lamps with multi-stage dimmer adjustment in the market so that users can adjust luminance of the lamps according to environmental luminance. What's more, an automatic luminance-adjusting lamp is designed so that lighting luminance can be automatically adjusted according to ambient luminance to enhance power-saving effect.

With reference to FIG. 6, an automatic luminance-adjusting lamp has a luminance sensor 62 externally mounted thereon for a driving circuit 61 of the lamp to receive sensing signals of the luminance sensor 62, and determine and adjust luminance of the lamp. As regular lamps are always lit after being turned on, the luminance sensor must be positioned away from the lamp shells of the lamps to only receive the ambient luminance of the lamp. Hence, the luminance sensor 62 is mounted on an outer periphery of a lamp shell 60 and is located at a position not easily affected by light emitted by the lamp, such as on a top of the outer periphery of the lamp shell. However, besides a compromise of its aesthetic appeal, the lamp with such arrangement is still affected by the ambient luminance fails to provide accurate luminance in response to the ambient luminance.

With reference to FIG. 7, another automatic luminance-adjusting lamp is shown. To more accurately sense ambient luminance of the lamp and not to be affected by light emitted by the lamp, the lamp has an extension circuit 63 and a luminance sensor 62. The extension circuit 63 is externally connected to an outer periphery of the lamp. One terminal of the luminance sensor 62 is connected to the extension circuit 63 so that the luminance sensor 62 can be positioned away from the lamp to acquire more accurate ambient luminance.

No matter which one of the foregoing arrangements of the luminance sensor is chosen, the tradeoff of enhancing accuracy in sensing ambient luminance creates a complicated lamp structure. For a replaceable bulb, the complicated lamp structure is redundant and lowers customers' willingness to purchase. With reference to FIG. 8, dedicated to regular replaceable bulbs, a small lampshade 621 is mounted on a bottom of the lamp shell to fix the luminance sensor 62 therein so that the luminance sensor 621 can accurately sense the ambient luminance even though the lamp is lit. Likewise, the lamp with such arrangement also compromises the aesthetic appeal of the lamp and creates shadow as a result of the blockage of the small lampshade 621 to lessen original lighting of the lamp.

Despite the power-saving effect, the lamps with the function of sensing ambient luminance fail to take factors of lighting and saving power into account.

SUMMARY OF THE INVENTION

An objective of the present invention is to provide an AC LED lamp adaptive to ambient luminance capable of accurately sensing ambient luminance.

To achieve the foregoing objective, the AC LED lamp has a lamp shell, an LED lamp board, a luminance sensor and an LED driving circuit.

The lamp shell has a light exit surface.

The LED lamp board is mounted inside the lamp shell and has multiple LED elements mounted thereon, and faces the light exit surface.

The luminance sensor is mounted inside the lamp shell and faces the light exit surface.

The LED driving circuit is mounted inside the lamp shell and is electrically connected to the LED lamp board and the luminance sensor so that the LED elements on the LED lamp board are alternately driven to turn on and turn off and a luminance signal is sensed by the luminance sensor while the LED elements are driven to turn off.

As the LED elements on the LED lamp board are alternately lit and put out and a luminance signal is sensed by the luminance sensor, which is mounted inside the lamp shell, while the LED elements are unlit, the luminance signal contains the ambient luminance only, accurate ambient luminance for the lamp can be therefore acquired without the tradeoff of additional extension circuit or small lampshade, thereby further keeping the look of the lamp intact for the aesthetic purpose and requiring no complicated lamp structure.

Preferably, the control unit has a preset fixed luminance range delimited by a lower bound and an upper bound and is built in with an automatic luminance control procedure to control a luminance of light emitted by the LED lamp board according to an ambient luminance.

The automatic luminance control procedure has steps of:

calculating a current luminance value of light emitted by the LED lamp board;

calculating a current ambient luminance value;

summing up the current luminance value and the current ambient luminance value to obtain a total luminance value;

determining if the total luminance value exceeds a range of the fixed luminance range, if the total luminance value is greater than the lower bound and less than the upper bound of the fixed luminance range, maintaining the current average current of the LED lamp board, if the total luminance value is less than the lower bound of the fixed luminance range, increasing the average current, and if the total luminance value is greater than the lower bound of the fixed luminance range, decreasing the average current.

When the ambient luminance value alters and one of the two determination results is met, the LED driving circuit then increase or decrease the average current of the luminance of the LED lamp board to address automatic adjustment of luminance emitted by the LED lamp board purely according to the ambient luminance and save power.

Other objectives, advantages and novel features of the invention will become more apparent from the following detailed description when taken in conjunction with the accompanying drawings.

BRIEF DESCRIPTION OF THE DRAWINGS

FIG. 1 is a front view of an AC LED lamp adaptive to ambient luminance in accordance with the present invention operated in a lit condition;

FIG. 2 is a front view of the AC LED lamp in FIG. 1 in an unlit condition;

DETAILED DESCRIPTION OF THE INVENTION

Figure 3:
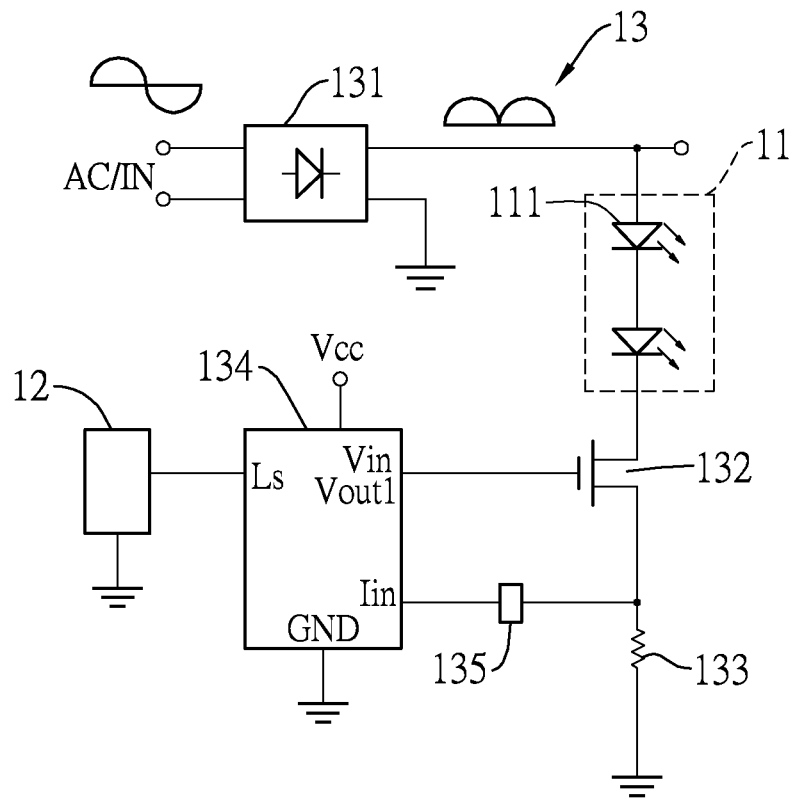
FIG. 3 is a circuit diagram of an LED driving circuit of the AC LED lamp in FIG. 1.

With reference to FIG. 1, an AC LED lamp in accordance with the present invention has a lamp shell 10, an LED lamp board 11, a luminance sensor 12 and an LED driving circuit 13.

The lamp shell 10 has a light exit surface 101. The LED lamp board 11 is mounted inside the lamp shell 10, and has multiple LED elements 111 mounted thereon, facing the light exit surface 101, and connected to each other by one of series connection, parallel connection and series-parallel connection. The luminance sensor 12 is mounted inside the lamp shell 10 and face the light exit surface 101. The LED driving circuit 13 is mounted inside the lamp shell 10 and is electrically connected to the LED lamp board 11 and the luminance sensor 12 so that the LED elements 111 on the LED lamp board 11 can be alternately driven to turn on and off and the luminance signal can be sensed by the luminance sensor 12 while the LED elements 111 are driven to turn off as shown in FIG. 2.

With reference to FIG. 3, the LED driving circuit 13 has a full-bridge rectifier 131, a voltage-controlled transistor 132, a current detection unit 133 and a control unit 134.

The full-bridge rectifier 131 is connected to an AC power source and the LED lamp board 11 and converts the AC power into a half-wave DC power. A positive output terminal of the full-bridge rectifier 131 is connected to an anode of the LED lamp board 11. One terminal of the voltage-controlled transistor 132 is connected to the cathode of the LED lamp board 11. The voltage-controlled transistor 132 may be a power transistor, such as an MOSFET or an IGBT. In the present embodiment, the voltage-controlled transistor 132 is an MOSFET and has a source, a drain and a gate (a control terminal). The current detection unit 133 is connected between another terminal of the voltage-controlled transistor 132 and a negative output terminal of the full-bridge rectifier 131 to constitute a power loop through the voltage-controlled transistor 132. In the present embodiment, the current detection unit 133 is a resistor and has a fixed resistance value. The control unit 134 is connected to the control terminal (gate) of the voltage-controlled transistor 132 and is connected to the current detection unit 133 through a low-pass filter 135 to detect a turn-on current of the LED lamp board 11 and control a voltage of the voltage-controlled transistor 132, so as to adjust an average current of the LED lamp board 11.

From the foregoing description, the turn-on current while the LED lamp board 11 is lit can be detected by the current detection unit 133. According to the magnitude of the turn-on current, a current of the voltage-controlled transistor 132 is controlled so that the average current of the LED lamp board 11 can be further controlled. Hence, the control unit 134 can adjust the current value of the LED lamp board 11 to alter luminance of light emitted by the LED lamp board 11.

Figure 4A:
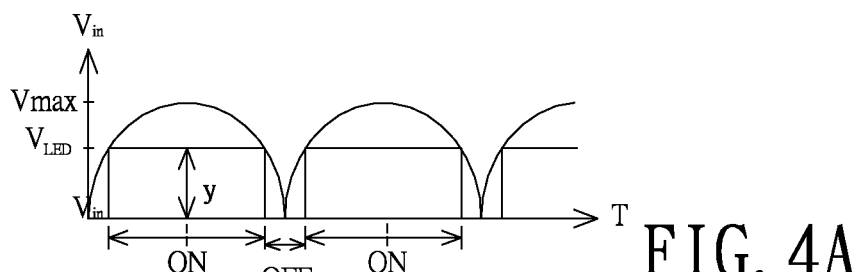
FIG. 4A is a waveform diagram of the LED driving circuit of the AC LED lamp in FIG. 1.
Figure 4B:
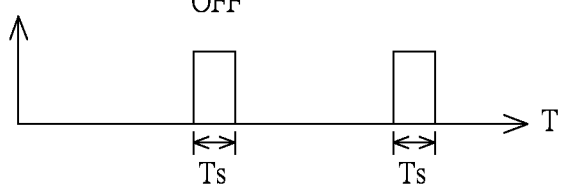
FIG. 4B is a time sequence diagram of the LED driving circuit of the AC LED lamp in FIG. 1.

Moreover, a turn-on cycle (ON) of the LED lamp board can be obtained by comparing a driving voltage $V_{LED}$ of the LED lamp board 11 with a peak voltage value $V_{max}$ of the half-wave DC power. With reference to FIG. 4A, the control unit 134 detects the turn-on current while the LED lamp board 11 is lit through the current detection unit 134. Therefore, the control unit 134 can calculate the average current of the LED lamp board 11. The average current can be obtained according to a luminance value of light emitted by the LED elements 111 on the LED lamp board 11, namely, $L_{LED}=f(x1)$.

Figure 5:
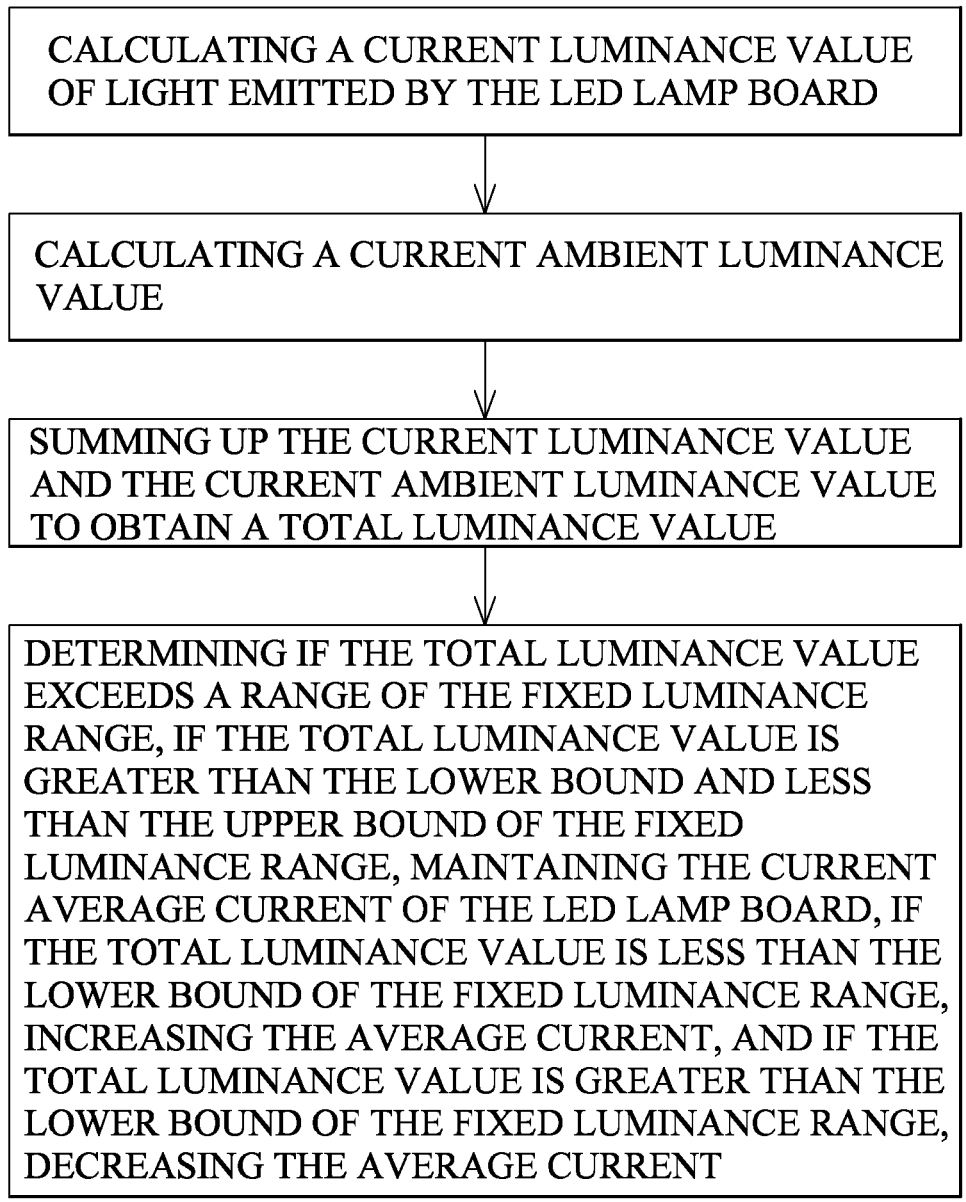
FIG. 5 is a flow diagram of an automatic luminance control procedure in accordance with the present invention.
Figure 6:
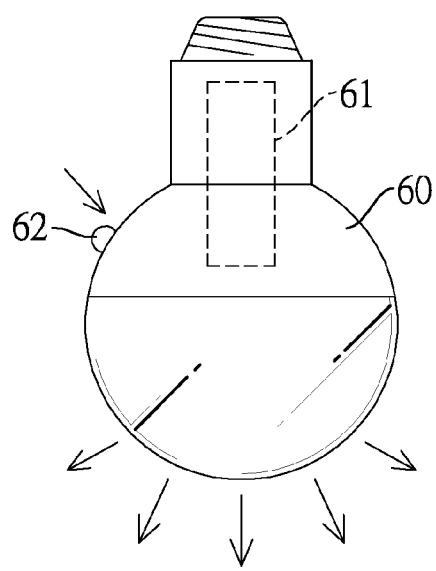
FIG. 6 is a first front view of a conventional lamp with a luminance adjusting function.
Figure 7:
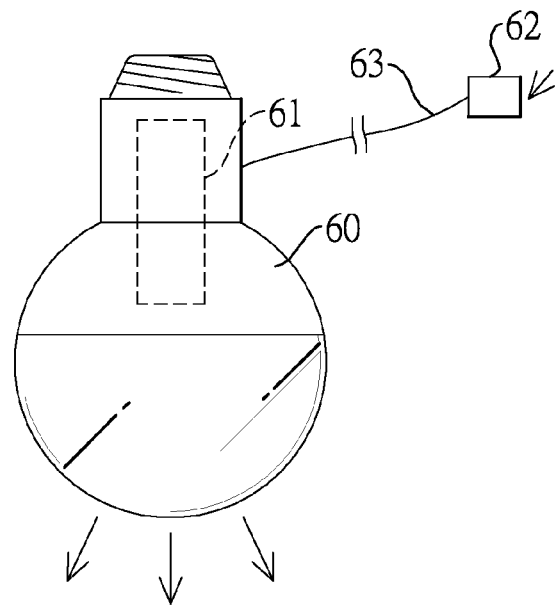
FIG. 7 is a second front view of a conventional lamp with a luminance adjusting function.
Figure 8:
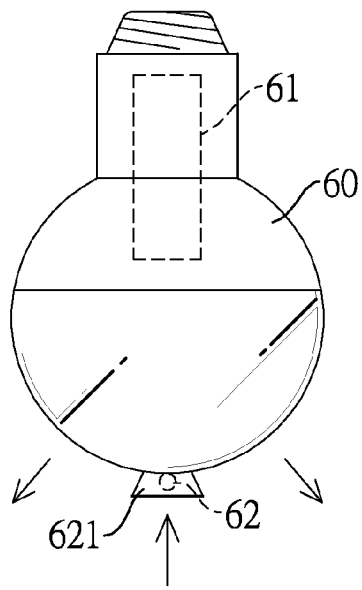
FIG. 8 is a third front view of a conventional lamp with a luminance adjusting function.

If the control unit 134 of the LED driving circuit 13 of the present invention has a preset fixed luminance range delimited by a lower bound $L_{target\_min}$ and an upper bound $L_{target\_max}$, the control unit 134 can be built in with an automatic luminance control procedure to control a luminance of light emitted by the LED lamp board 11 according to an ambient luminance. With reference to FIG. 5, the automatic luminance control procedure has the following steps.

Calculate a current luminance value $L_{LED}$ of light emitted by the LED lamp board. The details can be referred to the foregoing description.

Calculate a current ambient luminance value $L_S$.

Sum up the current luminance value $L_{LED}$ and the current ambient luminance value $L_S$ to obtain a total luminance value $L_{Total}=L_{LED}+L_S$.

Determine if the total luminance value exceeds the range of the fixed luminance range. If the total luminance value is greater than the lower bound and less than the upper bound of the fixed luminance range, maintain the current average current of the LED lamp board. If the total luminance value is less than the lower bound of the fixed luminance range, increase the average current. If the total luminance value is greater than the lower bound of the fixed luminance range, decrease the average current.

In sum, the LED driving circuit can detect the average current of the LED lamp board while the LED lamp board is lit. Based on the proportional relationship between the average current value and the luminance value of light emitted by the LED lamp board, the value of the luminance of light emitted by the LED lamp board can be calculated. The sum of the value of the luminance of light emitted by the LED lamp board and the value of the ambient luminance sensed by the luminance sensor, namely the total luminance value, is further compared with the preset fixed luminance range. If the total luminance value is less than the lower bound of the fixed luminance range, the average current of the LED driving circuit is increased. If the total luminance value is greater than the upper bound of the fixed luminance range, the average current of the LED driving circuit is decreased. Accordingly, when the value of the ambient luminance is altered and matches one of the determination results, the luminance of the LED lamp board can be automatically adjusted according to the ambient luminance by increasing or decreasing the average current of the LED driving circuit, thereby achieving to save power.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An alternating current (AC) light-emitting diode (LED) lamp adaptive to ambient luminance comprising:
   a lamp shell having a light exit surface;
   an LED lamp board mounted inside the lamp shell and having multiple LED elements mounted thereon, and facing the light exit surface;

a luminance sensor mounted inside the lamp shell and facing the light exit surface; and an LED driving circuit mounted inside the lamp shell and electrically connected to the LED lamp board and the luminance sensor so that the LED elements on the LED lamp board are alternately driven to turn on or turn off and the LED driving circuit driving circuit receives a luminance signal is sensed by the luminance sensor while the LED elements are driven to turn off.

2. The AC LED lamp as claimed in claim 1, wherein the LED driving circuit has:

a full-bridge rectifier connected to an AC power source and the LED lamp board and converting the AC power into a half-wave DC power, wherein a positive output terminal of the full-bridge rectifier is connected to an anode of the LED lamp board;

a voltage-controlled transistor, wherein one terminal of the voltage-controlled transistor is connected to the cathode of the LED lamp board;

a current detection unit connected between another terminal of the voltage-controlled transistor and a negative output terminal of the full-bridge rectifier to constitute a power loop through the voltage-controlled transistor; and a control unit connected to a control terminal of the voltage-controlled transistor and connected to the current detection unit through a low-pass filter to detect a turn-on current of the LED lamp board and control a voltage of the voltage-controlled transistor, so as to adjust an average current of the LED lamp board.

3. The AC LED lamp as claimed in claim 2, wherein the control unit has a preset fixed luminance range delimited by a lower bound and an upper bound and is built in with an automatic luminance control procedure to control a luminance of light emitted by the LED lamp board according to an ambient luminance;

the automatic luminance control procedure has steps of:

calculating a current luminance value of light emitted by the LED lamp board;

calculating a current ambient luminance value;

summing up the current luminance value and the current ambient luminance value to obtain a total luminance value; and determining if the total luminance value exceeds a range of the fixed luminance range, if the total luminance value is greater than the lower bound and less than the upper bound of the fixed luminance range, maintaining the current average current of the LED lamp board, if the total luminance value is less than the lower bound of the fixed luminance range, increasing the average current, and if the total luminance value is greater than the lower bound of the fixed luminance range, decreasing the average current.

4. The AC LED lamp as claimed in claim 3, wherein the step of calculating a current luminance value further has steps of:

comparing a driving voltage of the LED lamp board with a peak voltage value of the half-wave DC power to calculate a turn-on cycle of the LED lamp board;

detecting the turn-on current while the LED lamp board is lit through the current detection unit;

calculating the average current of the LED lamp board; and obtaining the luminance value of light emitted by the LED lamp board according to the average current.

5. The AC LED lamp as claimed in claim 4, wherein the LED elements of the LED lamp board are connected to each other by one of series connection, parallel connection and series-parallel connection.

6. The AC LED lamp as claimed in claim 4, wherein the voltage-controlled transistor is an MOSFET or an IGBT.

7. The AC LED lamp as claimed in claim 4, wherein the current detection unit is a resistor.

8. The AC LED lamp as claimed in claim 3, wherein the LED elements of the LED lamp board are connected to each other by one of series connection, parallel connection and series-parallel connection.

9. The AC LED lamp as claimed in claim 3, wherein the voltage-controlled transistor is an MOSFET or an IGBT.

10. The AC LED lamp as claimed in claim 3, wherein the current detection unit is a resistor.

11. The AC LED lamp as claimed in claim 2, wherein the LED elements of the LED lamp board are connected to each other by one of series connection, parallel connection and series-parallel connection.

12. The AC LED lamp as claimed in claim 2, wherein the voltage-controlled transistor is an MOSFET or an IGBT.

13. The AC LED lamp as claimed in claim 2, wherein the current detection unit is a resistor.

14. The AC LED lamp as claimed in claim 1, wherein the LED elements of the LED lamp board are connected to each other by one of series connection, parallel connection and series-parallel connection.

15. The AC LED lamp as claimed in claim 1, wherein the voltage-controlled transistor is an MOSFET or an IGBT.

16. The AC LED lamp as claimed in claim 1, wherein the current detection unit is a resistor.

* * * * *